Patented Aug. 29, 1939

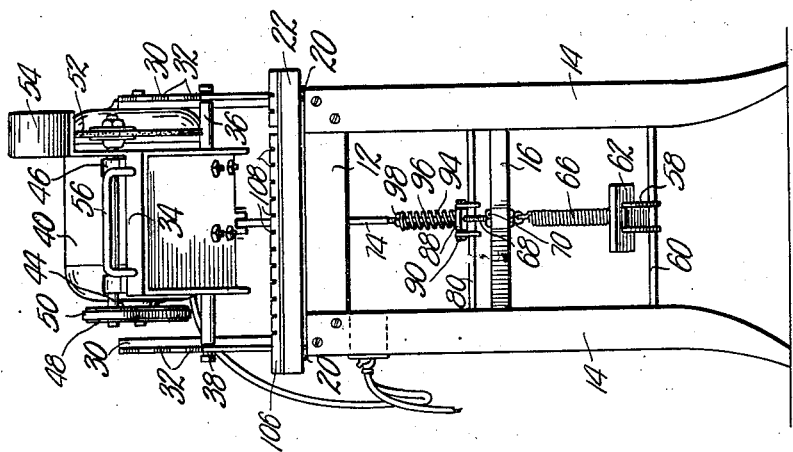

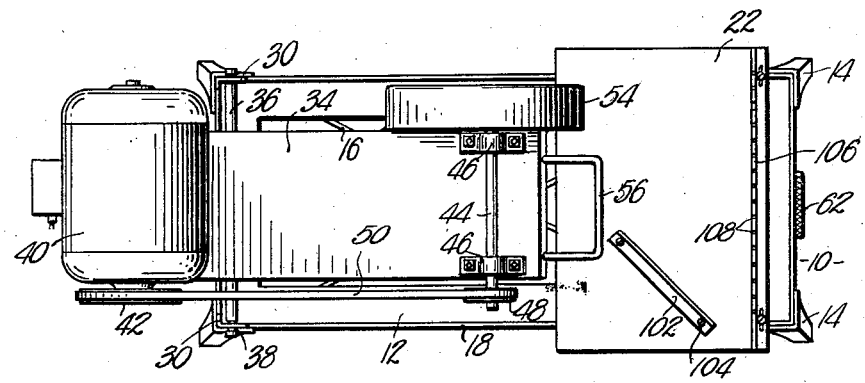
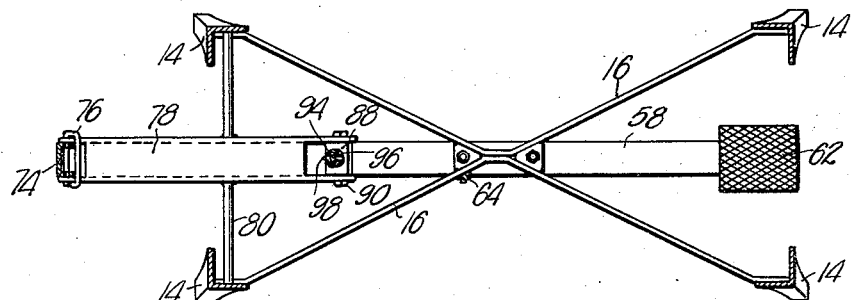
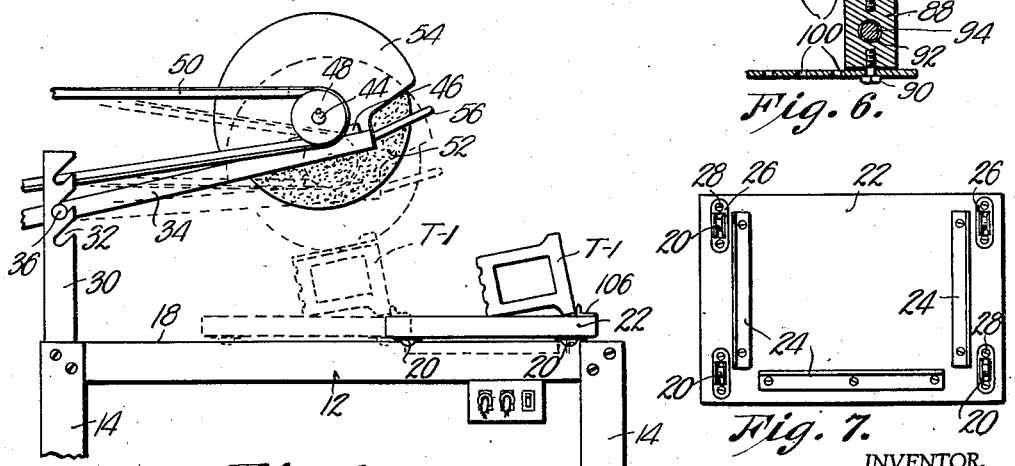

2,171,024

UNITED STATES PATENT OFFICE 2,171,024

TILE CUTTING MACHINE

Neligh Clair Coates, Kansas City, Mo.

Application January 19, 1938, Serial No. 185,708

6 Claims. (Cl. 125—13)

This invention relates to improvements in tile cutting machines and has for its principal object, the provision of a simple and inexpensive machine that is easily adjusted and operated to execute the various operations necessary in preparing and fitting building tile or stone.

Another object of this invention is the provision of a tile cutting machine wherein the cutting blade is mounted for foot or hand oscillation to and from the tile to be cut.

A further object of this invention is the provision of a tile cutting machine wherein a platform, pivoted intermediate its ends, serves as a carrier for the operating motor and the cutting blade whereby said platform is substantially balanced and easily operated to and from the work by means of a foot lever and interconnecting parts wherein equalizing springs are used to facilitate the different operations.

A still further object of this invention is the provision of a tile cutting machine wherein is provided a tile supporting carriage which is movable by the operator relative to the cutting blade so as to make it possible to vary the depth of cut at will.

Heretofore it has been the common practice to definitely set the cutting blade and secure it in position to produce a kerf in the stone at a given depth, and after said kerf is cut, then readjusting the cutter to a further depth and repeating the operation. It is the purpose of this invention to overcome this extremely slow operation due to the foot or hand control of the cutter at all times during the cutting operation. By means of the present machine, it is possible to cut a surface which is at an angle to the direction of travel of the tile being cut. These and many other advantages of this machine will appear during the course of the following specification.

Reference will now be had to the drawings wherein,

Figure 1 is a side elevation of a tile cutting machine wherein certain parts are shown in two positions embodying this invention.

Fig. 2 is a front elevation of said machine.

Fig. 3 is a plan view of the machine with a certain guide member positioned on the carriage.

Fig. 4 is a horizontal section taken on line IV—IV of Fig. 1.

Fig. 5 is a fragmentary view of a portion of the machine showing its use in cutting an irregularly shaped tile.

Fig. 6 is an enlarged fragmentary section taken on line VI—VI of Fig. 1, and,

Fig. 7 is an inverted plan view of the carriage.

Throughout the several views, like reference characters designate similar parts and the numeral 10 designates a base including a rectangular top frame 12, supported by legs 14 which are rigidly secured thereto and joined together therebelow by means of diagonally disposed brace member 16 which extends adjacent the center portion and below said frame. The rectangular member 12 is constructed by the use of angle irons having upturned flanges 18 which serve as tracks on which the flanged wheels 20 of the carriage 22 are adapted to travel as the carriage is moved lengthwise of the base member. This carriage 22 is preferably made of a heavy wood block with reinforcing metal strips 24—said wood block being recessed on its underside to receive flanged wheels 20 which are mounted in bearing members 26 and secured to carriage 22 by means of screws 28.

The rear end of base 10 is provided at its opposite sides with standards 30 which extend thereabove. These standards are provided with corresponding, aligned, downwardly extending notches 32.

A platform 34 is provided intermediate its ends with a pivot member 36 which extends beyond each side thereof and is provided with an annular groove 38 adjacent each end. These grooves 38 are so spaced apart as to register with the respective notches 32 in said spaced apart standards. Mounted on the outer end of platform 34 is a motor 40 having a drive pulley 42. At the opposite end of platform 34 is rotatably mounted shaft 44 in bearings 46. This shaft is in parallel relation with the axis of the motor and is provided at its one end with a drive pulley 48 which is in alignment with pulley 42 and connected therewith by an endless belt 50. The opposite end of shaft 44 is provided with a cutting blade 52 which is preferably of the carborundum type and suitable for high speed cutting. This cutting blade is protected by guard 54 which may be cast integral with platform 34.

An operating hand-hold 56 is provided for hand manipulation of the parts, as hereinafter described.

The weight of the platform and its associated members is so distributed relative to the pivot 36, that said platform will be substantially balanced, thereby facilitating easy operation of the machine during the cutting operation.

The foot operation of the cutter blade 52 is accomplished through means of the following structure:

The foot lever 58 pivoted at 60 to the rear legs 14, is provided at its front end with a foot rest 62. This lever 58 is normally held in the raised position against the adjustable stop 64 by means of expansion spring 66. This spring 66 is secured at its lower end to foot lever 58 and at its upper end to an adjustable threaded rod 68 which may be adjusted by means of nut 70 to vary the tension of spring 66.

Pivoted to the outer end of platform 34 at 72 is a depending arm 74 which is secured at its lower extremity by means of pin 76 to the rear end of arm 78, which is pivoted intermediate its ends by means of rod 80 to the rear legs 14. The lower end portion of arm 74 is provided with a series of openings 82 whereby the connection with arm 74 may be varied by simply removing pin 76 and positioning the opening in arm 78 in register with any one of the openings 82.

The foot lever 58 is resiliently interconnected with the forward end of arm 78 by means of member 84 pivoted at 86 to said lever and extending upwardly to contact the underside of the forward end of arm 78. Forward end of arm 78 is bifurcated, as clearly shown in Fig. 6, and is provided with a block 88 which is secured thereto for slight oscillation by means of screws 90.

Block 88 is provided with a transverse opening 92 adapted to receive the rod 94 rigidly attached to the upper end of member 84. Mounted on rod 94 and resting on block 88 is a compression spring 96, which is held under compression by means of adjusting nut 98 threaded on rod 94. Block 88 may be adjusted to and from the pivotal point of the arm 78 by simply moving the same and selectively positioning it in register with any of the various sets of openings 100 formed in arm 78.

By use of the two springs 66 and 96 in the connections between the foot lever 58 and platform 34, it is possible for the operator to more easily and definitely determine the depth of cut in the tile, and since the parts carried by platform 34 are positioned in such a manner relative to the pivotal point 36 as to substantially balance said platform, it is very evident that the cutter blade may be easily adjusted to position and the pressure exerted by the foot will indicate more definitely the exact amount of pressure being exerted to force the cutter blade into the tile.

Referring to Fig. 1 wherein the tile T is shown positioned on the platform in the upright position in solid lines, it will be apparent that when the cutter is in the position indicated by A, that when the carriage is moved along its track, the tile will freely pass beneath said cutter and that when the cutter is lowered to the position indicated by B, then a shallow cut would be made as the tile is moved therebeneath. This operation may be repeated as many times as desired in order to properly score the tile. The tile may then be placed on its side as indicated by dotted lines, and the cutter moved to position C to score the side portion of the tile in alignment with the top scoring. Also the opposite side of the tile may likewise be scored, thus making it possible to break the tile along predetermined lines to produce an even breaking of the tile. One advantage of this type of machine is the fact that very light cuts may be made very rapidly, due to the foot control of the vertical position of the cutter.

Another type of tile T—1, shown in Fig. 5 is difficult to cut by the old method, however, due to the foot control of this machine, it is very evident that when the tile is in the position shown in dotted lines, a cut may be made along the upwardly and forwardly inclined side of said tile by the operator since he will be able to determine the depth of cut by the pressure exerted on the foot lever; thereby making it possible to vary the vertical position of the cutter at will.

In some instances it may be found convenient to operate the vertical position of the cutter by means of the hand-hold 56, however, in many instances, the carriage 22 is moved along the tracks by grasping both sides of the carriage and positioning the foot lever to determine the depth of the cut. In some instances, it is found necessary to cut tile at some predetermined angle and it is for the purpose of definitely positioning the tile on the carriage that a rest 102 is temporarily secured to the carriage 22 by means of screws 104. In all work wherein the tile is being cut at 90° to any of the sides thereof, the abutting stop 106 is used. This stop is preferably provided with graduated slots 108 which serve to facilitate proper positioning of the tile relative to the cutting blade.

It is very evident from the foregoing description that a tile cutting machine has been produced which will definitely cut, or score tile to any desired depth regardless of its inclination relative to the direction of travel, by simply operating a foot lever and moving the tile relative to the cutting blade. Furthermore, the cutter may be adjusted vertically by changing the pivotal axle of the platform from one set of notches 32 to another set.

Having thus described the invention, what is claimed as new and desired to be secured by Letters Patent is:

1. A tile cutting machine comprising a base having tracks and fixed standards; a platform pivotally and vertically adjustably mounted for oscillation on said standards; a cutting blade carried by said platform above said base; means for operating said cutting blade; a tile supporting carriage mounted for free rectilinear movement along said track beneath said cutting blade; a foot operated lever resiliently interconnected with said platform and operable to move said cutting blade toward said base; and resilient means whereby said cutting blade is moved away from said base.

2. A tile cutting machine comprising a base having fixed standards and parallel tracks; a platform mounted for oscillation on said standards; a cutting blade carried by said platform above said base; a tile supporting carriage mounted for reciprocating movement along said track beneath said cutter blade; a lever resiliently interconnected with said platform and operable to move said blade toward said carriage; and means operable to normally maintain said cutter blade in the raised position.

3. A tile cutting machine comprising a base having spaced apart parallel tracks and fixed standards; a platform pivotally mounted for oscillation on said standards; a cutting blade carried by said platform above said base; means for operating said cutting blade carried by said platform; a tile supporting carriage mounted for movement along said track beneath said cutter blade; and a lever resiliently interconnected with said platform and operable to move said cutting blade toward said carriage and resilient means operable to move said lever to a normal position and to urge said cutter blade to the raised position.

4. A tile cutting machine comprising a base having spaced apart standards, each being provided with a series of notches formed therein; a platform having a transversely disposed axis intermediate its opposite ends whereby said platform is pivotally mounted with the axis thereof positioned with its opposite ends in corresponding slots in said standards; a rotary cutting blade carried by said platform and adapted to be moved toward and from said base as said platform is oscillated on its axis; and means operable to cause said platform to oscillate.

5. A tile cutting machine comprising a base having spaced apart standards, each being provided with a series of notches formed therein; a platform having a transversely disposed axis intermediate its opposite ends whereby said platform is pivotally mounted with the axis thereof positioned with its opposite ends in corresponding slots in said standards; a rotary cutting blade carried by said platform and adapted to be moved toward and from said base as said platform is oscillated on its axis; and a tile supporting carriage mounted on said base and adapted to be moved in a straight line at a right angle to the axis of rotation of said cutting blade.

6. A tile cutting machine comprising a base having spaced apart parallel tracks and fixed standards; a platform pivotally mounted for oscillation on said standards; a cutting blade carried for oscillation by said platform above said base; means for operating said cutting blade carried by said platform; a tile supporting carriage having flanged walls and mounted for free rectilinear movement along said track beneath said cutter blade; an operating lever adjustably and resiliently interconnected with said platform and operable to move said cutting blade downwardly in an arc above said base; and resilient means associated with said operating lever whereby said cutting blade is normally held in a predetermined raised position above said carriage.

NELIGH CLAIR COATES.